United States Patent
Hatcher

(10) Patent No.: US 7,175,499 B2
(45) Date of Patent: Feb. 13, 2007

(54) METHOD FOR CREATING CONTROLLED PRESSURE RELEASE IN A PNEUMATIC DEVICE

(76) Inventor: Forest Hatcher, P.O. Box 1555, Flagler Beach, FL (US) 32136

( * ) Notice: Subject to any disclaimer, the term of this patent is extended or adjusted under 35 U.S.C. 154(b) by 87 days.

(21) Appl. No.: 10/794,239

(22) Filed: Mar. 6, 2004

(65) Prior Publication Data

US 2006/0102417 A1    May 18, 2006

Related U.S. Application Data

(60) Provisional application No. 60/452,764, filed on Mar. 7, 2003.

(51) Int. Cl.
 *G08B 3/00*   (2006.01)
 *A63H 5/00*   (2006.01)
(52) U.S. Cl. .......................... 446/213; 124/1; 446/181; 446/397; 181/119
(58) Field of Classification Search ................ 124/56, 124/60, 71, 73, 74, 75, 76, 77, 61, 63, 64, 124/1; 446/475, 176, 211, 213, 398, 399, 446/400, 401, 405, 184, 181; 181/119, 120; 367/142; 222/3, 5
See application file for complete search history.

(56) References Cited

U.S. PATENT DOCUMENTS

| | | | | |
|---|---|---|---|---|
| 1,334,867 A | * | 3/1920 | Langos | 446/182 |
| 2,031,785 A | * | 2/1936 | North et al. | 446/181 |
| 2,853,133 A | * | 9/1958 | Norman et al. | 73/864.44 |
| 5,230,324 A | * | 7/1993 | Van Horssen et al. | 124/61 |
| 5,353,779 A | * | 10/1994 | Lyon | 124/57 |
| 5,803,791 A | * | 9/1998 | Chiles | 446/475 |
| 6,483,437 B1 | * | 11/2002 | Gelchion et al. | 340/691.1 |
| 6,604,518 B1 | * | 8/2003 | Sanford et al. | 124/56 |
| 6,749,481 B1 | * | 6/2004 | Yap et al. | 446/213 |

FOREIGN PATENT DOCUMENTS

WO    WO 02/057613 A2 *   7/2002

\* cited by examiner

*Primary Examiner*—Michael J. Carone
*Assistant Examiner*—James S. Bergin
(74) *Attorney, Agent, or Firm*—Joseph S. Heino; Patrick M. Bergin

(57) ABSTRACT

The present invention provides a means for holding the components of the device, a means for storing gas under pressure which is maintained separately from the interior of the device until actuating, a means for releasing pressurized gas from the storage device into the interior of the device, a means for actuating the device upon an external event, a means for retaining the pressurized gas in the interior of the device until a desired internal pressure level is achieved and a means for channeling the pressurized gas that is released upon actuation so that the energy supplied propels a pressurized fluid to explosively pass outside of the device through the conduit.

5 Claims, 3 Drawing Sheets

METHOD FOR CREATING CONTROLLED PRESSURE RELEASE IN A PNEUMATIC DEVICE

CROSS-REFERENCE TO RELATED APPLICATION

The present application is based on and claims priority to U.S. Provisional Application Ser. No. 60/452,764 filed on Mar. 7, 2003.

BACKGROUND OF THE INVENTION

This invention relates to simulated weapon devices, simulated explosive devices, nonlethal and less-than-lethal weapon systems. This invention was created to provide for the development and use of non-pyrotechnically based weapons and weapon simulators.

SUMMARY OF THE INVENTION

The Method for Creating Controlled Pressure Release in a Pneumatic Device was developed for a wide variety of applications which utilized pressurized gas for a means of actuating an event. A typical application of the method would be to fire a projectile.

Devices which utilize pressurized gas to actuation an event are commonly known and include air rifles, pneumatic nail guns, paintball guns and similar devices. However, in each of these applications, the compressed gas is introduced from a storage device through a valve and typically requires a mechanical means for opening and closing the valve. The Method for Creating Controlled Pressure Release in a Pneumatic Device has been developed to eliminate the use of a valve and the concomitant mechanical means for opening and closing the valve. This allows the method to be utilized in a number of devices and applications which would not otherwise be possible using the standard valve mechanisms. Such devices would include but not be limited to single shot projectile devices, simulated explosive devices (such as land mines and 'flash bangs') and related applications.

Many such devices utilize pyrotechnics and or explosive elements to achieve their results. Explosives are inherently unsafe and often require specialized training to utilize; this increases the cost and risk associated with pyrotechnically based training devices.

It is therefore an object of this invention to provide an alternative means of creating an 'explosive force' utilizing benign methods, in a manner which does not require specialized training.

This application addresses the basic method of utilizing a frangible membrane which will catastrophically fall at a predetermined pressure and which can be used to simulate the sound and other effects of an explosive device. The embodiment of the device contained within the specification provides for only a single application of the concept and should not be viewed as limiting the application in any way.

A key element of this method is the use of Frangible Pressure Control Membranes with a failure rate which is below that of the maximum pressure created in the Volume Chamber by the release of pressurized gas from the Gas Supply. A variety of uses and events can be actuated by selecting the proper failure pressure rate of the Frangible Pressure Control Membrane.

DETAILED DESCRIPTION OF THE INVENTION

Figure 1:
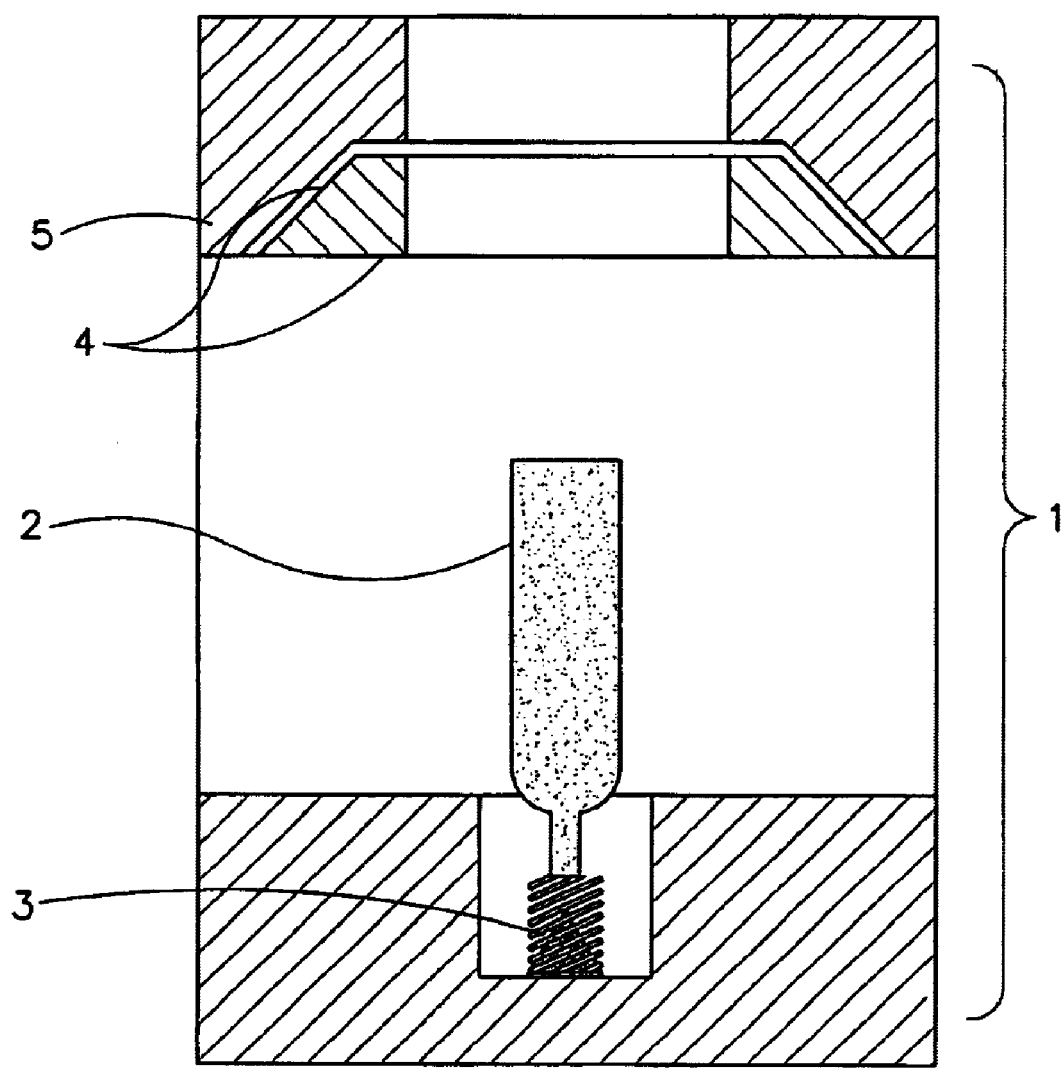
FIG. 1 contains a diagram of one embodiment of the device and its related components.
Figures 2A, 2B:
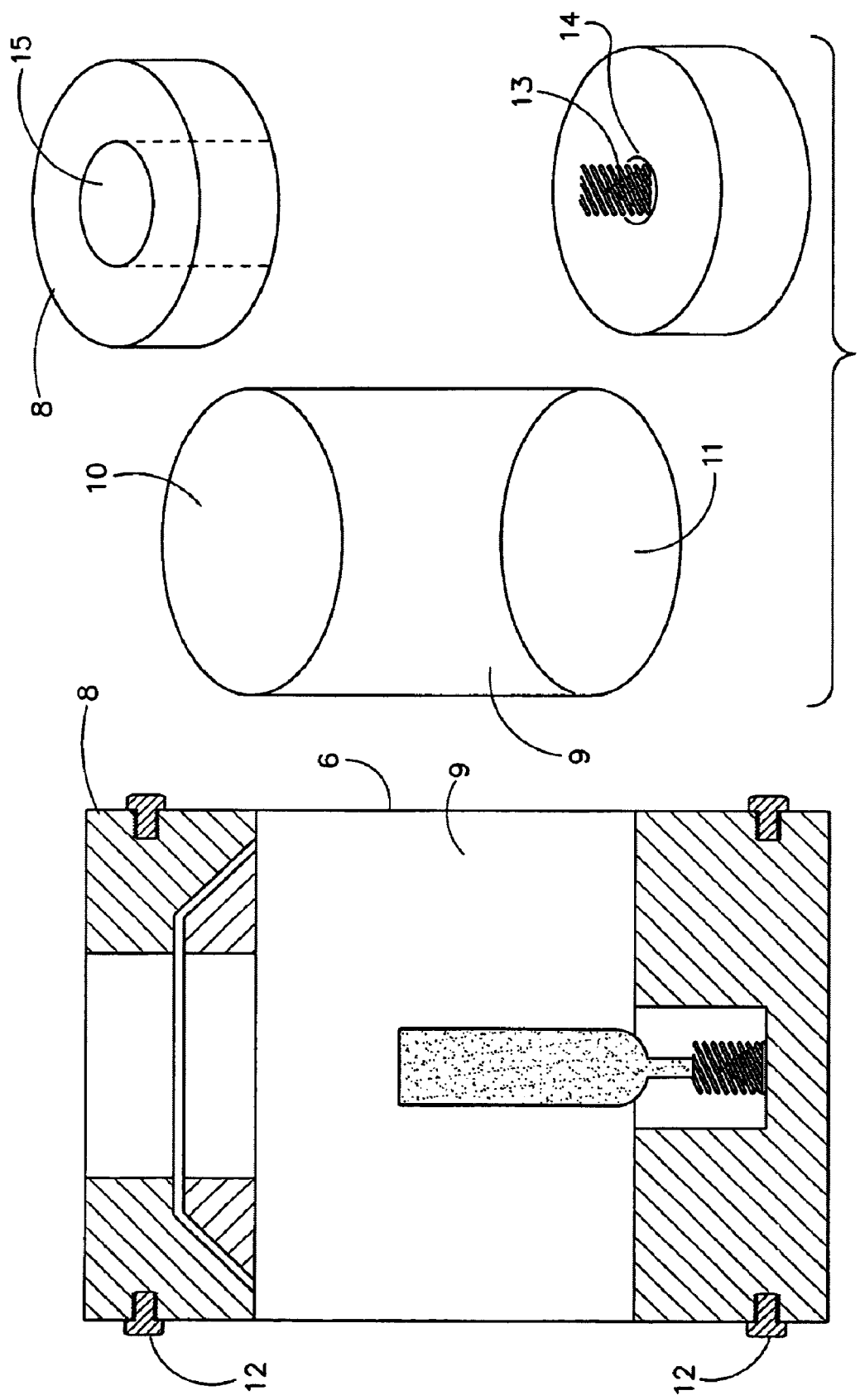
FIG. 2A contains a diagram further illustrating details of components of the device.
FIG. 2B contains diagrams illustrating details of the body and end caps of the device.
Figure 3A:
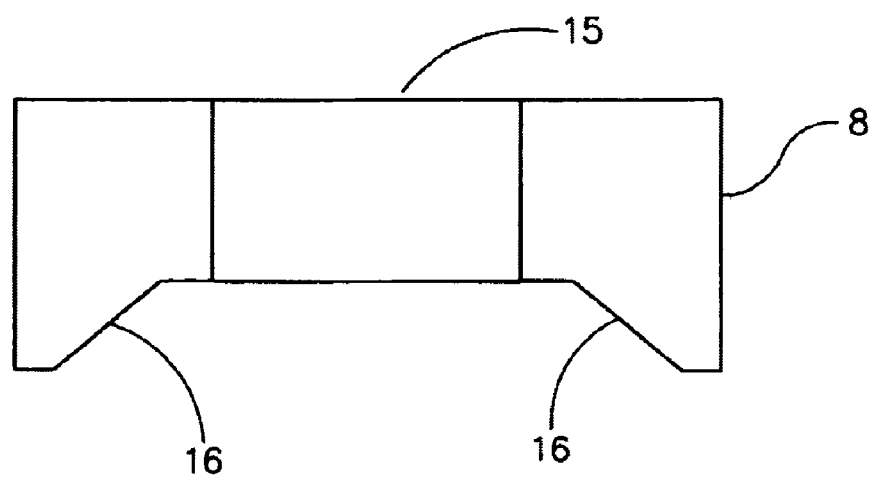
FIG. 3A contains a diagram illustrating the conduit and retainer in the Open End Cap.
Figure 3B:
FIGS. 3B and 3C show different views of the frangible membrane.
Figure 3C:
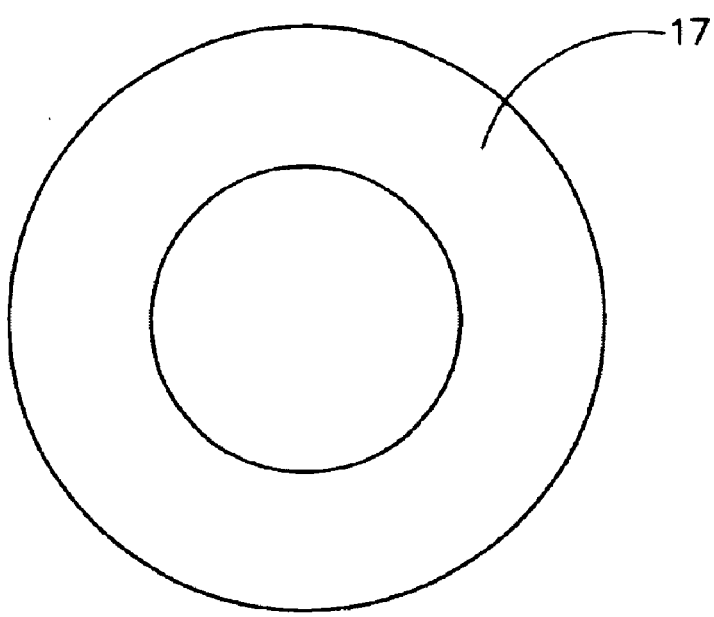

The Method for Creating Controlled Pressure Release in a Pneumatic Device consists of five primary components. These are the Main Body (1), a Pressurized Gas Supply (2), a Piercing Pin (3) or related means for introducing pressurized gas from the Gas Supply, A Frangible Pressure Control Membrane (4) and a Pressure Control Membrane Retainer (5).

The Main Body consists of the following four parts: A Body (6); a Piercing Pin End Cup (7); a Open End Cap (8); and a Volume Chamber (9). The Body (6) consists of a walled element with a first open and (10) and a second open end (11) connected by a chamber (9) running parallel with the long axis of the Body (6). The First Open End (10) and Second Open End (11) are configured with a releasable retaining method (12), sufficient to hold the Piercing Pin End Cap (7) and the Open End Cup (8) in place under fluid pressure.

The Piercing Pin End Cap (7) is releasably retained by screws or other method (12) in the Body (6). When attached to the Body (6), the Piercing Pin End Cap (7) will create a seal at one open end (11) of the Body (6) creating a partially closed volume. Centered within the Piercing Pin End Cap (7) and oriented so that it is contained within the interior of the Volume Chamber (9) in a Piercing Pin (13), which consists of a conical pin, capable of breaking the seal of the pressure vessel (2) when placed under sufficient force. Contiguous to the Piercing Pin (13) and orientated along the same axis as the Piercing Pin is a Return Device (14), consisting of a compressible element that will return to its original shape and size upon removing a load that it is placed under, such as a spring, and having sufficient force to push the Pressure Vessel (2) away from the Piercing Pin (13). The Return Device (14) must be shaped such that it can fit around the circumference of the Piercing Pin (13) but not around the circumference of the Pressure Vessel (2).

The Open End Cap (8) is releasably retained by screws or other method (12) in the Body (6). When attached to the Body (6), the Open End Cap (8) creates a partial seal at one open end (11) of the Body (6) creating a partially closed volume. The Open End Cap (8) consists of the Body of the End Cap, a means for receiving the retaining method (12) and a Conduit (15) with an opening that passes through the End Cap (8) and communicators with the interior Volume Chamber (9) of the Body (6).

The Interior side of the Open End Cap (8) is shaped with a tapered or stepped circular Retaining Wall (16) for retaining the Frangible Pressure Control Membrane (17). The Retaining Wall (16) is concentric with the Conduit (15) and the Interior Volume Chamber (9). The outer diameter of the Retaining Wall is of a diameter less than the interior diameter of the Volume Chamber (9) and greater than the outer diameter of the Frangible Pressure Control Membrane (17); the Retaining Wall provides for a smooth, uninterrupted surface which is capable of providing for a pressure seal when the Frangible Pressure Control Membrane is under pressure.

The Frangible Pressure Control Membrane (17) consists of a material capable of remaining intact until it reaches a pressure threshold. Upon reaching the pressure threshold, the material will catastrophically fail, allowing the pressurized fluid within the Volume Chamber (9) of the device to pass through Conduit (15).

The Pressurized Gas Supply (2) consists of a commercially available sealed pressure vessel, such as a 12-gram $CO_2$ cartridge or similar device which is capable of retaining a fixed volume of pressure gas at a fixed psi.

An external force, acting upon the portion of the Frangible Pressure Control Membrane (17) exposed by the Conduit (15) passing through the Open End Cap (8) will push the Pressure Vessel (2) down against the Return Device (14) and the Piercing Pin (13). The Piercing Pin (13) then creates as opening in the Pressure Vessel (2). Once the external force is removed from the device, the Return Device (14) forces the Pressure Vessel (2) away from the Piercing Pin (13) and allows the pressurized fluid contained within the Pressure Vessel (2) to be released into the Volume Chamber (9) of the device. The pressurized fluid will continue to vent into the Volume Chamber until the pressure threshold of the Frangible Pressure Control Membrane (17) is reached, after which the Frangible Pressure Control Membrane will fail, allowing the pressurized fluid to explosively pass outside of the device through the conduit (15).

The Piercing Pin End Cap (7) is fixed to the Body (6) of the device using the retaining means (12). A Pressurized Gas Vessel (2) is placed within the interior volume chamber (9) of the device, oriented so that its seal is adjacent to the piecing pin (13) and the Return Device (14). A Frangible Pressure Control Membrane (17) is placed within the Open End Cap (8), such that its outer diameter is contiguous to the Retaining Wall (16). The Open End Cap is then fixed to the Body (6) of the device using the retaining means (12).

Alternatively, the Method for Creating Controlled Pressure Release in a Pneumatic Device can be alternatively described as a means for holding the components of the device, a means for storing gas under pressure which is maintained separately from the interior of the device until actuating, a means for releasing pressurized gas from the storage device into the interior of the device, a means for actuating the device upon an external event, a means for retaining the pressurized gas in the interior of the device until a desired internal pressure level is achieved and a means for channeling the pressurized gas that is released upon actuation so that the energy supplied can be used to cause an additional event.

I claim:

1. A method for simulating an explosive event comprising the steps of:

providing a volume chamber having an open top and an open bottom, the volume chamber having an uninterrupted perimeter surface;

providing an open end cap having an aperture therethrough;

covering the aperture in the open end cap with a frangible membrane, the frangible membrane having an outer perimeter capable of providing a pressure seal against the inner perimeter surface of the volume chamber;

covering the top of the volume chamber with the open end cap; the frangible pressure membrane being enclosed within the open end cap;

covering the bottom of the volume chamber with a piercing end cap, the piercing end cap having a piercing device, the piercing device being surrounded by a spring;

providing a self-contained pressurized gas supply; the gas supply having a first end abutting the frangible means and the second end resting on the spring surrounding the piercing means; and pressing the frangible membrane downwardly until the piercing means ruptures the pressurized gas supply; the pressurized gas supply pressurizing the volume chamber until the frangible membrane fails, permitting fluid to escape from the volume chamber.

2. The method of claim 1 wherein the frangible membrane is constructed from a plastic element.

3. The method of claim 1 wherein the frangible membrane is constructed from a paper element.

4. The method of claim 1 wherein the frangible membrane is constructed from a rubber.

5. A pneumatic explosive device comprising:

a volume chamber having an open top and an open bottom, the volume chamber having an uninterrupted perimeter surface;

an open end cap having an aperture therethrough;

a frangible membrane covering the aperture in the open end cap, the frangible membrane having an outer perimeter capable of providing a pressure seal against the inner perimeter surface of the volume chamber;

a piercing end cap covering the bottom of the volume chamber, the end can having a piercing device extending therefrom, the piercing device being surrounded by a spring;

a self-contained pressurized gas supply; the gas supply being located such that it rests on the spring surrounding the piercing means;

wherein if the frangible membrane is pressed downwardly onto the piercing means, the pressurized gas supply is ruptured and pressurizes the volume chamber until the frangible pressure membrane fails and permits fluid to escape from the volume chamber.

* * * * *